United States Patent
Mäkelä et al.

(10) Patent No.: US 7,714,897 B2
(45) Date of Patent: May 11, 2010

(54) TRIGGER TONE OF A CAMERA

(75) Inventors: Kaj Mäkelä, Tampere (FI); Severi Uusitalo, Hämeenlinna (FI)

(73) Assignee: Nokia Corporation, Espoo (FI)

( * ) Notice: Subject to any disclaimer, the term of this patent is extended or adjusted under 35 U.S.C. 154(b) by 824 days.

(21) Appl. No.: 11/229,018

(22) Filed: Sep. 15, 2005

(65) Prior Publication Data

US 2007/0058052 A1   Mar. 15, 2007

(51) Int. Cl.
*H04N 5/235* (2006.01)
(52) U.S. Cl. ............... 348/221.1; 348/231.4; 348/231.1
(58) Field of Classification Search .............. 348/231.4
See application file for complete search history.

(56) References Cited

U.S. PATENT DOCUMENTS

| | | | |
|---|---|---|---|
| 4,270,852 A | | 6/1981 | Suzuki et al. |
| 4,327,985 A | | 5/1982 | Urushihara et al. |
| 4,420,773 A | * | 12/1983 | Toyoda et al. ............... 386/118 |
| 4,502,771 A | | 3/1985 | Katsuma et al. |
| 6,111,605 A | * | 8/2000 | Suzuki ................... 348/220.1 |
| 6,222,538 B1 | | 4/2001 | Anderson |
| 6,717,737 B1 | * | 4/2004 | Haglund .................. 359/631 |
| 7,286,177 B2 | | 10/2007 | Cooper ................ 348/333.02 |
| 7,362,352 B2 | * | 4/2008 | Ueyama ................. 348/207.1 |
| 7,502,074 B2 | * | 3/2009 | Narita et al. ............... 348/559 |
| 2002/0191081 A1 | | 12/2002 | Ueyama ................ 348/207.1 |
| 2003/0112361 A1 | * | 6/2003 | Cooper ...................... 348/364 |
| 2004/0046873 A1 | * | 3/2004 | Kubo et al. .............. 348/222.1 |
| 2004/0141727 A1 | * | 7/2004 | Daijo ......................... 386/96 |
| 2005/0140797 A1 | * | 6/2005 | Moon .................... 348/231.99 |
| 2006/0044452 A1 | * | 3/2006 | Hagino ..................... 348/345 |

FOREIGN PATENT DOCUMENTS

| | | |
|---|---|---|
| CN | 1430402 | 7/2003 |
| EP | 1551167 | 7/2005 |
| EP | 1555558 | 7/2005 |
| JP | 04-117799 | 4/2004 |
| JP | 05-101903 | 4/2005 |
| WO | 99/44166 | 9/1999 |

OTHER PUBLICATIONS

Patent Abstracts of Japan, Publication No. 2005-101903, "Imaging Apparatus, Photographing Verification Method, Image Verification Method in Reproducing Image, and Program," published Apr. 14, 2005.

(Continued)

*Primary Examiner*—James M Hannett
*Assistant Examiner*—Cynthia Calderon

(57) ABSTRACT

The invention relates to a digital camera comprising at least a memory unit for saving pictures and a control unit that is adapted to control the operation of the camera and to form a trigger tone on the basis of the state of the camera. The trigger tone indicates the triggering of the camera and the current state of the camera. The invention also relates to a method and a computer program product for forming an information tone of a digital camera.

12 Claims, 4 Drawing Sheets

OTHER PUBLICATIONS

Patent Abstracts of Japan, Publication No. 2004-117799, "Digital Camera," published Apr. 15, 2004.
Patent Abstracts of Japan, Publication No. 2005-086508, "Photographing Apparatus, Program Therefor, and Processing Method Thereof," published Sep. 9, 2003.
Patent Abstracts of Japan, Publication No. 57001748, "Camera Provided With Voice Transmitting Device," published Jul. 18, 1983.
Patent Abstracts of Japan, Publication No. 04-350248, "Digital Camera," published Dec. 9, 2004.
Patent Abstracts of Japan, Publication No. 05-020226, "Electronic Camera," published Jan. 20, 2005.
Patent Abstracts of Japan, Publication No. 54109838, "Audio device Built-In Camera," published Aug. 28, 1979.
English language translation of Chinese Office Action dated Jun. 5, 2009 for corresponding Chinese application No. 200680033745.1 (5 pages).

* cited by examiner

TRIGGER TONE OF A CAMERA

FIELD OF THE INVENTION

The present invention relates to a digital camera. The invention also relates to a method and a computer program product for forming an information tone of a digital camera.

BACKGROUND OF THE INVENTION

In classical film cameras the user can recognize the operation of the camera by hearing a shutter sound. In many digital cameras there is no mechanical sound when taking pictures. Therefore in some digital camera applications a shutter sound is generated by a separate sound source when an image is captured.

Usually digital cameras comprise some kind of a user interface (UI) that comprises said sound source and a display. In the display it is possible to show a great deal of information. This information can relate to the functions of the camera, for example to the memory or to the settings for image quality. Digital cameras often contain several settings for image quality. Through the settings a user can control the resolution and compression level of the final image.

In practice the user often takes pictures in a situation, where all attention is required. The user is not able to look at the display of the device. The display may also be turned off or the user interface elements may be hidden, so the information of the functions of the camera cannot be displayed. The settings may be different than the user would prefer in this situation, which may cause a negative user experience.

If the user is taking pictures with a digital camera without looking into the display or by using a mode where the image quality setting indication is not visible, the user may continue shooting pictures with the wrong settings for a long period of time. A similar problem exists if the user is taking pictures with a digital camera without looking into the display or by using a mode where memory indication is not visible; the user is not aware of running out of memory while shooting pictures.

Therefore in some digital cameras warning tones (or sounds) are used, such as beeps, to note that there may be some problems in the operation of the camera. For example the memory is running out, the battery is almost empty, or some settings are wrong.

SUMMARY OF THE INVENTION

The aim of this invention is to present a new solution to inform a user of a digital camera.

One main idea of this invention is to change a trigger tone (or sound) of a digital camera in order to inform a user. A changing trigger tone indicates the triggering of the camera and the current state of the camera. For example, the triggering tone can be advance information of some forthcoming technical event. The information can also relate to some existing problems. The trigger tone is formed on the basis of changing pieces of information, such as utilization rate of memory, battery level, selected exposure program, or some error (such as, for example, exposure error, error related to triggering, error related to focusing).

A digital camera comprises at least a memory unit for saving pictures and a control unit that is adapted to control the operation of the camera and to form a trigger tone on the basis of the current state of the camera. The trigger tone indicates the triggering of the camera and the current state of the camera. The camera also comprises a tone generator that is adapted to play the formed changing trigger tone.

In a method in photographing after the triggering of a camera, the method comprises the step of forming a trigger tone on the basis of the current state of the camera and the trigger tone indicating the triggering of the camera and the current state of the camera.

A computer program product comprises a memory means where the computer-readable program is stored, wherein the computer-readable program comprises instructions for providing a trigger tone that indicates the triggering of the camera and the current state of the camera.

In one solution the trigger tone is changed depending on the status of available memory. In another solution the trigger tone is changed based on the image quality setting.

The changing of the tone may be done by using a different tone file or by changing the playback parameters of a tone file, e.g. the tone may be slower or higher in pitch. The trigger tone can vary in many ways. For example, length, pitch, frequency, volume, and/or melody of a tone can change. In one solution the whole melody of the tone is changed. Advantageously different trigger tones differ significantly, so the user can recognize the changes.

An advantage of the method and device of the invention is that the user does not need to look at the screen to get information. Also, the different solutions offer many other advantages. For example, a given solution can offer one or more of the following advantages:

the user does not need to look at the screen to know the current image quality setting the user does not need to look at the screen to know that the memory is running out the user can be prepared for the memory running out and can change the memory medium in advance.

DESCRIPTION OF THE DRAWINGS

In the following, the invention will be described in more detail with reference to the appended principle drawings, in which.

For the sake of clarity, the figures only show the details necessary for understanding the invention. The structures and details which are not necessary for understanding the invention and which are evident for anyone skilled in the art have been omitted from the figures in order to emphasize the characteristics of the invention.

DETAILED DESCRIPTION OF THE INVENTION

Figure 1:
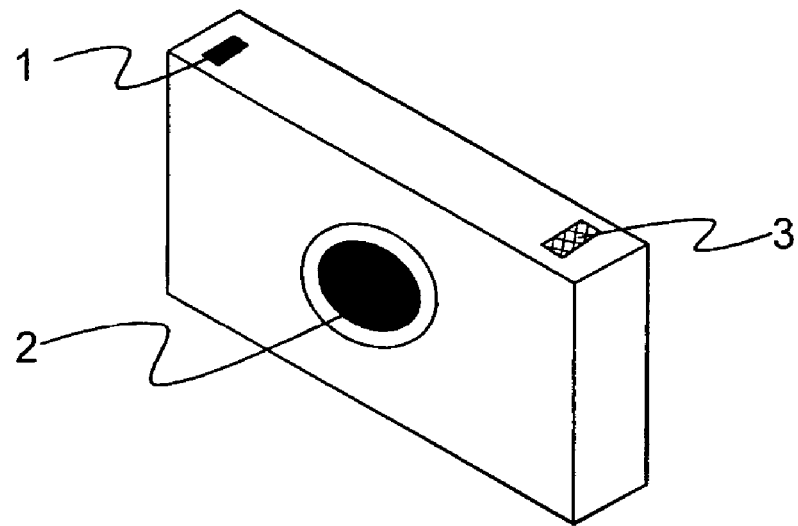
FIG. 1 shows a device according to the invention.

FIG. 1 shows one example of a digital camera. In this example is shown a trigger button 1, a lens arrangement 2, and a loudspeaker 3. It is possible to use the present invention in many solutions. In some solutions the device is a typical digital camera and in some solutions the camera unit is integrated with other units. For example, the device could be a mobile phone, a computer, a game device, a communication device, etc.

Figure 2:
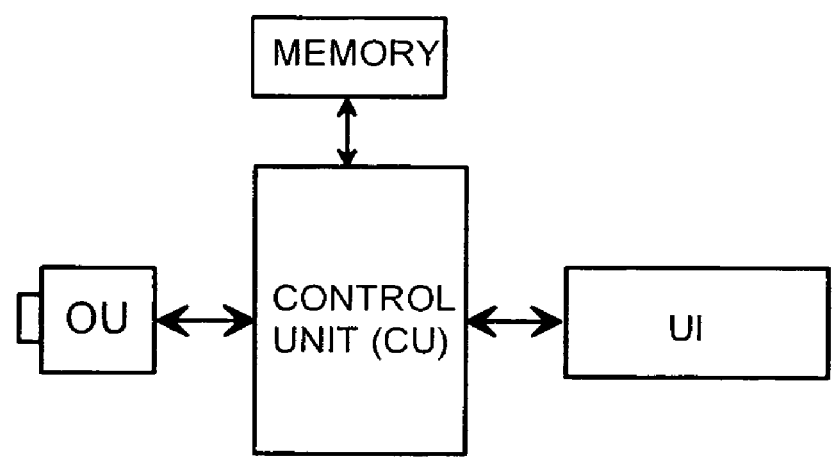
FIG. 2 shows a block diagram of a device according to the invention.

FIG. 2 shows a block diagram of a device according to the present invention. The device comprises at least an optical unit OU, a control unit CU, a memory unit (MEMORY) and a user interface UI. The optical unit OU typically comprises some kind of a lens arrangement and a detector component, such as a CCD or a CMOS-component. The control unit CU is in turn arranged to control the function of the camera. The memory unit is arranged to store the pictures. The memory unit can be, for example, a fixed unit, a removable unit or some kind of a combination of fixed and removable units. Usually some kind of removable memory cards are used.

The user interface UI comprises at least a tone generator that can generate the trigger tone. Usually there is also at least one display. Different kinds of information are shown on the display. Usually a display is also used as a viewfinder.

Figure 3:
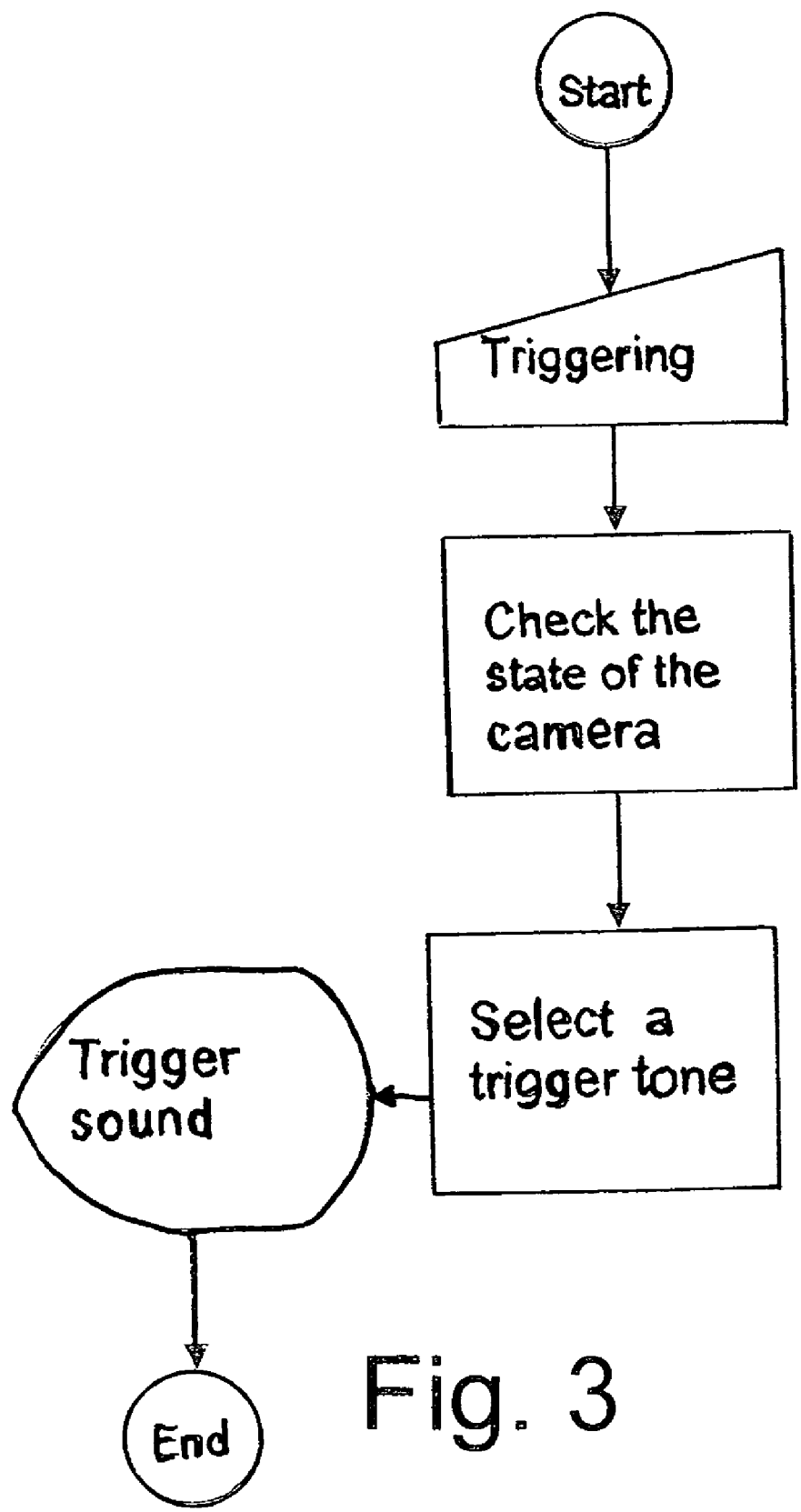
FIG. 3 shows a flow diagram of an example.

FIG. 3 shows an example of a system, where the trigger tone indicates the triggering of the camera and the current state of the camera, and the trigger tone changes on the basis of the state of the camera.

When the user pushes the trigger button 1 of the camera, the system (for example the control unit CU) checks the state of camera. Then the system checks if there are any features and/or values, which have been defined to belong to those features and/or values that will be indicated by the trigger tone. If these features and/or values exist, the control unit forms the trigger tone equivalent to these features and/or value.

The tone may be formed in many ways, for example, by using a different tone file or by changing the playback parameters of a tone file. The trigger tone can vary in many ways. For example, length, pitch, frequency, volume, and/or melody of a tone can change. In one solution the whole melody of the tune is changed. Advantageously a specified trigger tone is specified to indicate a specified information. Advantageously different trigger tones differ significantly, so the user can recognize the changes.

In one application the trigger tone is formed and played before the trigger button 1 is pushed completely down. For example, when the trigger button 1 is pushed half way, the system checks if there are any features and/or values, which have been defined to belong to those features and/or values that will be indicated by the trigger tone. If these features and/or values exist, the control unit forms the trigger tone equivalent to these features and/or value. In this application the user will get information before the picture is captured. The user will have the possibility to stop the photographing before the triggering and, for example, the user can make the desired changes to the settings of the camera before the final triggering.

Figure 4:
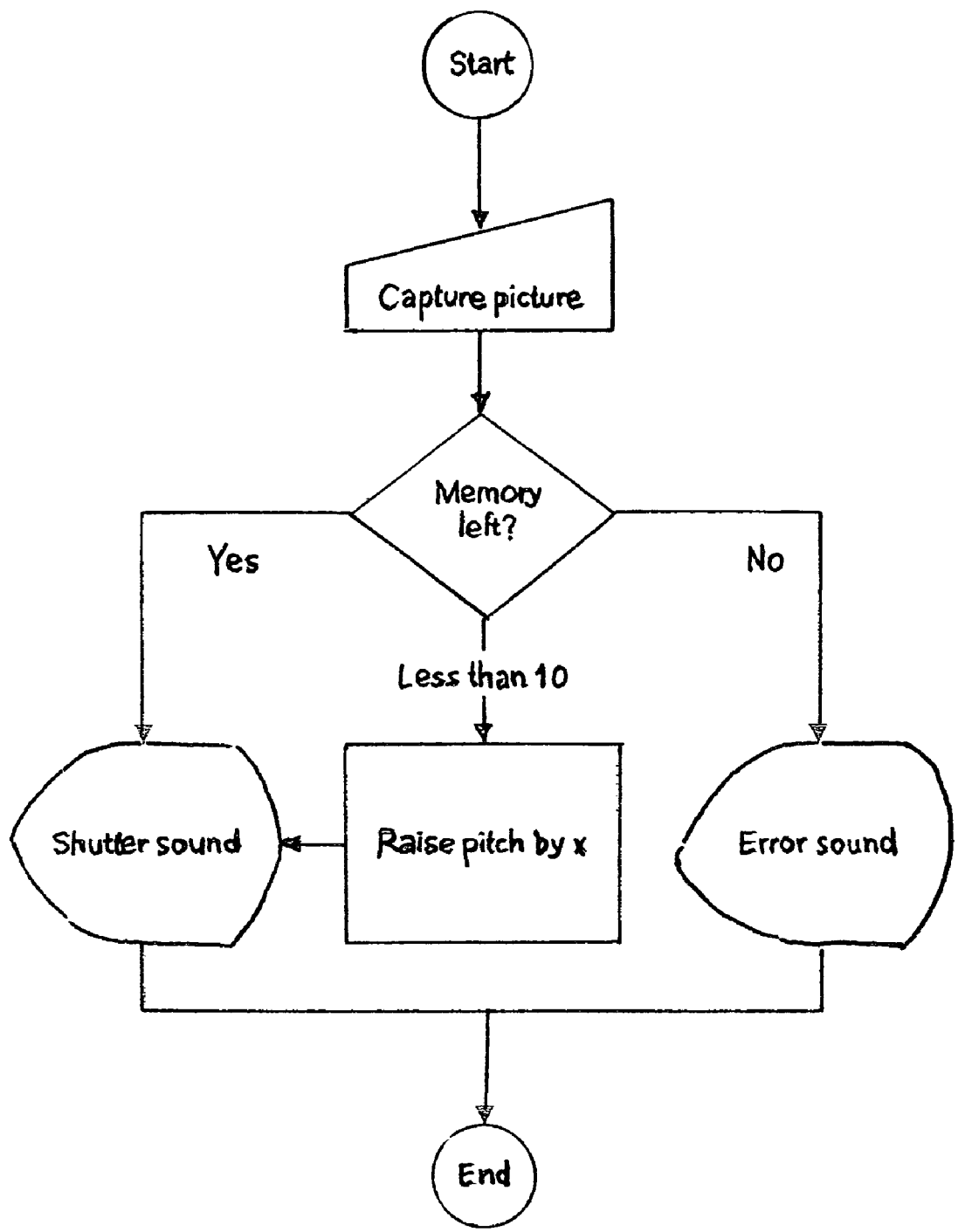
FIG. 4 shows a flow diagram of another example.

FIG. 4 shows an example of a system, where the trigger tone is formed depending on the status of available memory.

When the user pushes the trigger button 1 of the camera, the system (for example the control unit CU) checks how much free memory capacity there is in the memory. In one solution if there is no memory capacity left—memory is full—the system forms an error tone.

If there is memory for less than ten pictures, the system will use changed triggering tones. Of course there could be some other threshold value than ten. The forming of the tone may be done by using a different tone file or by changing the playback parameters of a tone file, e.g. the tone may be slower or higher in pitch. For example, in one implementation the tone pitch of the trigger tone is increased to indicate the level of memory filling. This behavior is similar to the behavior of the tone of blowing a bottle filled with liquid. The natural association helps understanding the meaning of the pitch change.

If there is more free memory capacity than what is needed for ten pictures (or some other threshold value), the system will use a normal triggering tone in this example.

In addition to a normal camera trigger tone mechanism in this solution there the memory status is checked. Also the amount of pictures fitting to the memory is calculated and the amount is compared to the threshold value. After that a suitable tone file is selected or the appropriate parameters of playback are changed.

Figure 5:
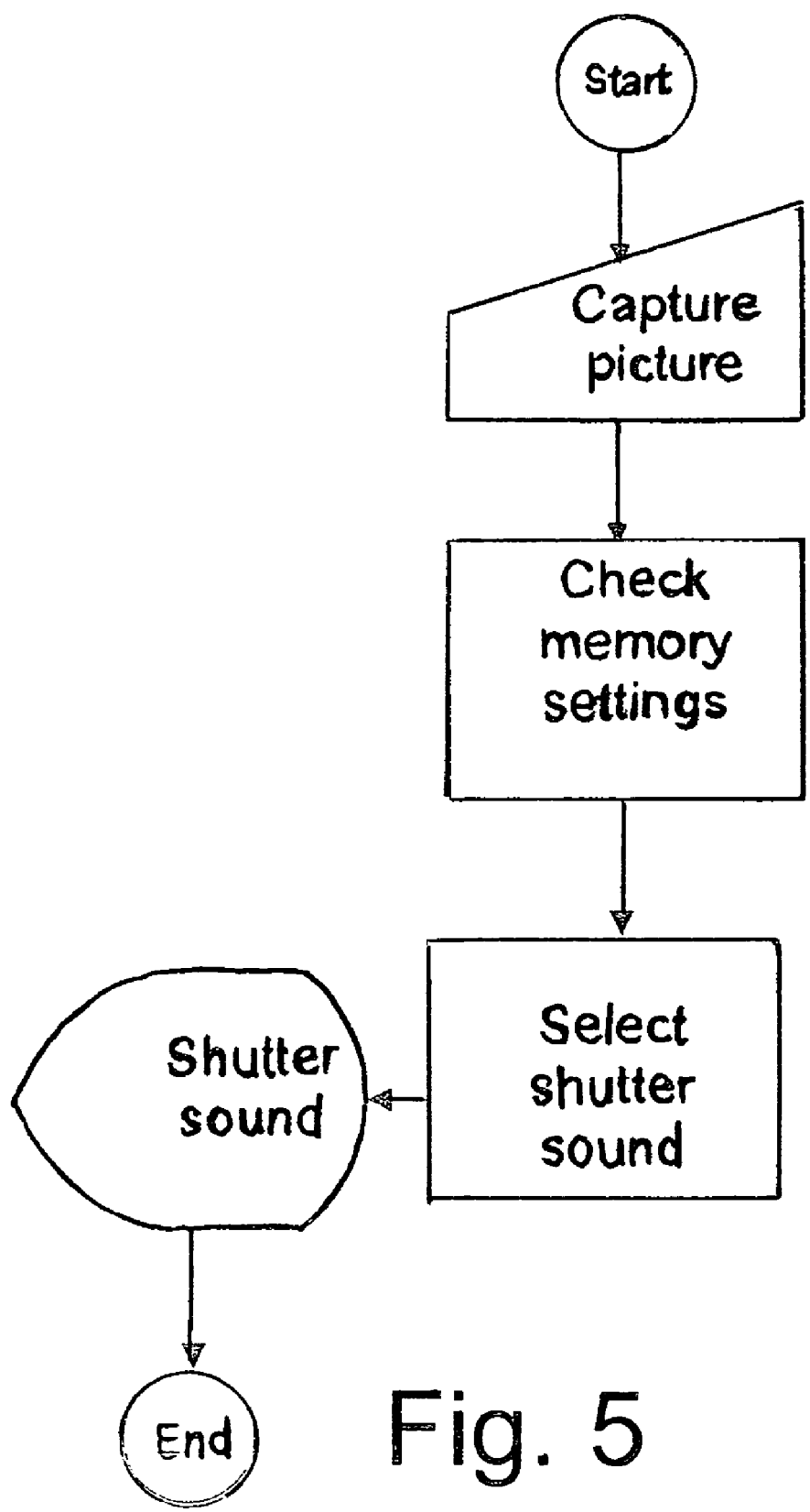
FIG. 5 shows a flow diagram of another example.

FIG. 5 shows an example where the trigger tone is changed based on an image quality setting. When the user pushes the trigger button 1 of the camera, the system (for example the control unit CU) checks the image quality settings. The trigger tone is changed depending on the image quality setting. The changing of the tone may be done by using a significantly different tone, either by using a different tone file or by changing the playback parameters of a tone.

In addition to a normal camera trigger tone mechanism in this solution the image quality setting is checked and a suitable tone file is selected or the appropriate parameters of playback are changed.

The trigger tone can also change based on the nature of the program being used. In some cameras it is possible to select programs depending on the purpose of use. For example, there could be special programs for sport, night, portrait, and/or landscape photography.

In some implementations the trigger tone is changed if there is some problems and/or errors in a photography session. The camera could in some cases recognize if a wrong program or wrong settings are used, or if the camera is shaken, or if there is a problem with the flash etc. In some solutions the camera could recognize if there are errors in the operation of the camera, such as, for example, exposure error, error related for triggering, error related for focusing, error related for saving.

In a typical solution the method according to the present invention is executed at least partly by a program. Usually a program (software) comprises commands and instructions, which executed by a processor prompt the processor to perform the method. A computer program product comprises a memory means where the computer-readable program is stored, wherein the computer-readable program comprises instructions for providing the method. Typically the memory means of the digital camera are in the control unit CU of the digital camera, or they are in connection with the control unit. In some solutions the memory means is memory for transferring the program, such as a disk, a CD, a DVD, a memory card, etc. The program can also be in the memory of a computer, a server, or other device.

By combining, in various ways, the modes and structures disclosed in connection with the different embodiments of the invention presented above, it is possible to produce various embodiments of the invention in accordance with the spirit of the invention. Therefore, the above-presented examples must not be interpreted as restrictive to the invention, but the embodiments of the invention may be freely varied within the scope of the inventive features presented in the claims hereinbelow.

The invention claimed is:

1. A digital camera comprising at least
a trigger button configured to trigger the camera,
a memory unit configured to save pictures,
a control unit that is configured to
control operation of the camera, and
form a trigger tone in response to the trigger button being at least partially pushed down, and
a tone generator that is configured to play a formed trigger tone,
wherein the control unit is configured to form the trigger tone based on a current state of the camera, and to change the trigger tone based on a utilization of memory capacity and a memory capacity threshold, wherein the control unit is configured to form the trigger tone with increasing pitch for decreasing capacity.

2. The digital camera according to claim 1, wherein the control unit is configured to form the trigger tone with a shutter sound before said memory capacity threshold is reached.

3. The digital camera according to claim 1, wherein the control unit is configured to form the trigger tone with an error sound after there is no memory capacity left.

4. The digital camera according to claim 2, wherein the control unit is configured to form the trigger tone with an error sound after there is no memory capacity left.

5. A method comprising:
   forming a trigger tone in response to a trigger button of a camera being at least partially pushed down,
   forming the trigger tone based on a current state of the camera, and
   changing the trigger tone based on a utilization level of memory capacity for storing pictures and a memory capacity threshold, wherein the trigger tone is formed with increasing pitch for indicating decreasing capacity.

6. The method according to claim 5, wherein the trigger tone is formed with a shutter sound before said memory capacity threshold is reached.

7. The method according to claim 5, wherein the trigger tone is formed with an error sound after there is no memory capacity left.

8. The method according to claim 6, wherein the trigger tone is formed with an error sound after there is no memory capacity left.

9. A computer-readable medium having computer program code stored thereon, said code executable in a data processing device for maintaining an information tone of a digital camera, wherein when said code is executed it causes said device to perform
   providing a trigger tone in response to a trigger button of the camera being at least partially pushed down,
   forming the trigger tone based on a current state of the camera, and
   changing the trigger tone based on a utilization level of memory capacity for storing pictures and on a memory capacity threshold, wherein the computer program code comprises instructions, which when executed, further cause said camera to perform providing the trigger tone with increasing pitch for decreasing capacity.

10. The computer readable medium according to claim 9, wherein the computer program code comprises instructions, which when executed, further cause said camera to perform providing the trigger tone with a shutter sound before said memory capacity threshold is reached.

11. The computer readable medium according to claim 9, wherein the computer program code comprises instructions, which when executed, further cause said camera to perform providing the trigger tone with an error sound after there is no memory capacity left.

12. The computer readable medium according to claim 10, wherein the computer program code comprises instructions, which when executed, further cause said camera to perform providing the trigger tone with an error sound after there is no memory capacity left.

* * * * *